Jan. 7, 1930.  L. SAIVES  1,742,788
BRAKE FOR VEHICLES
Original Filed Aug. 28, 1924   3 Sheets-Sheet 2
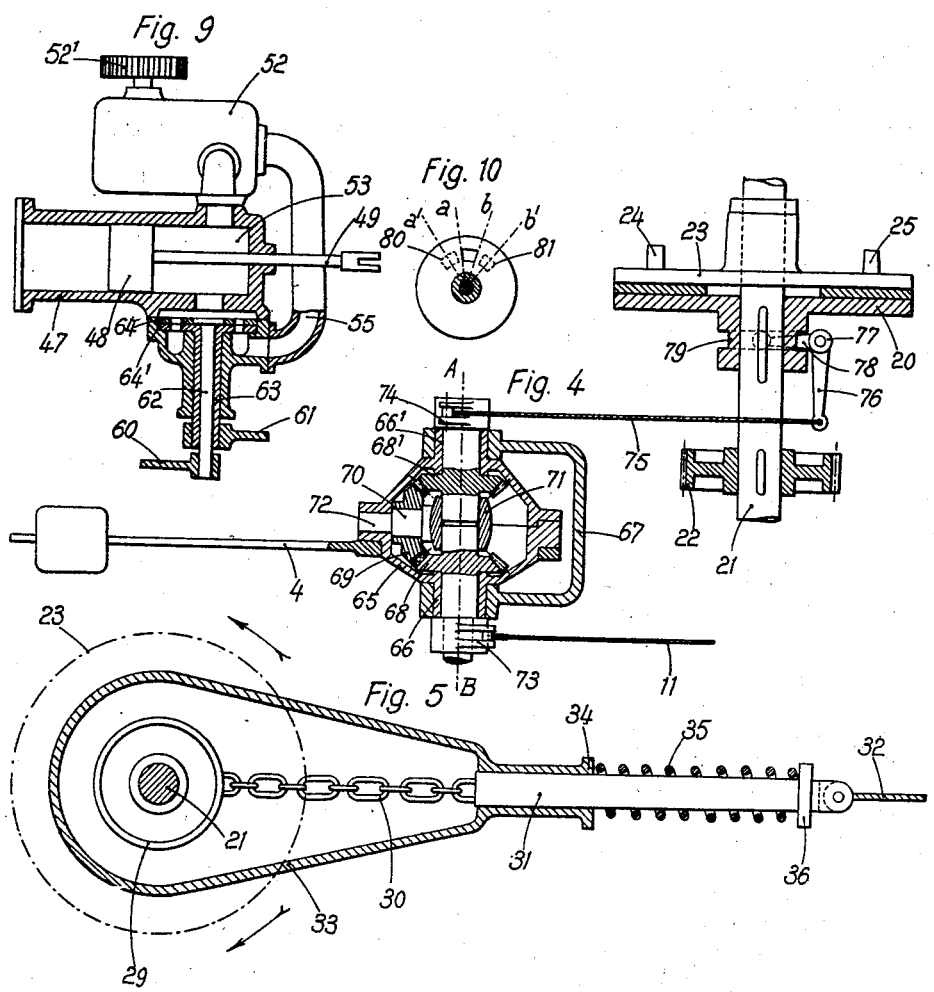

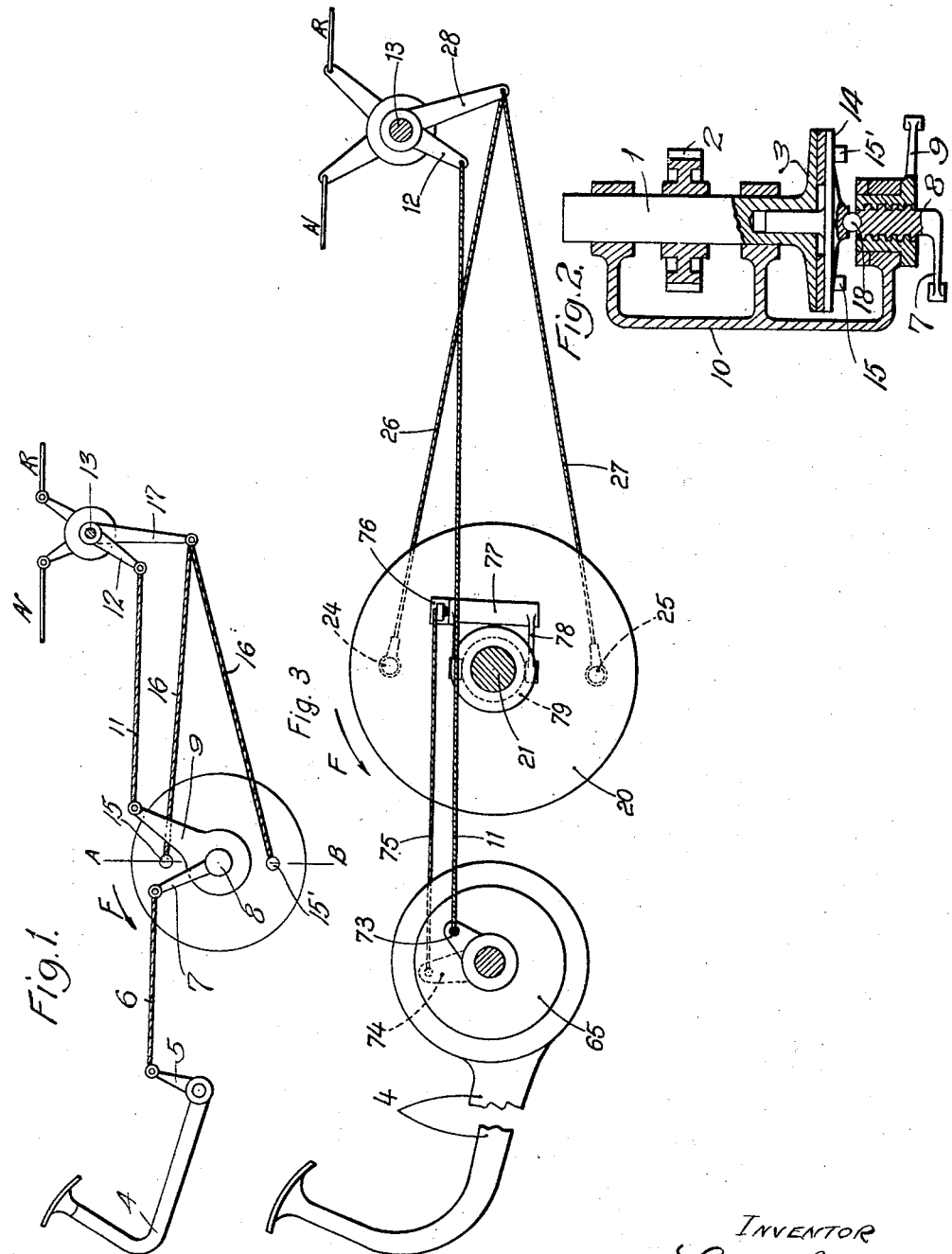

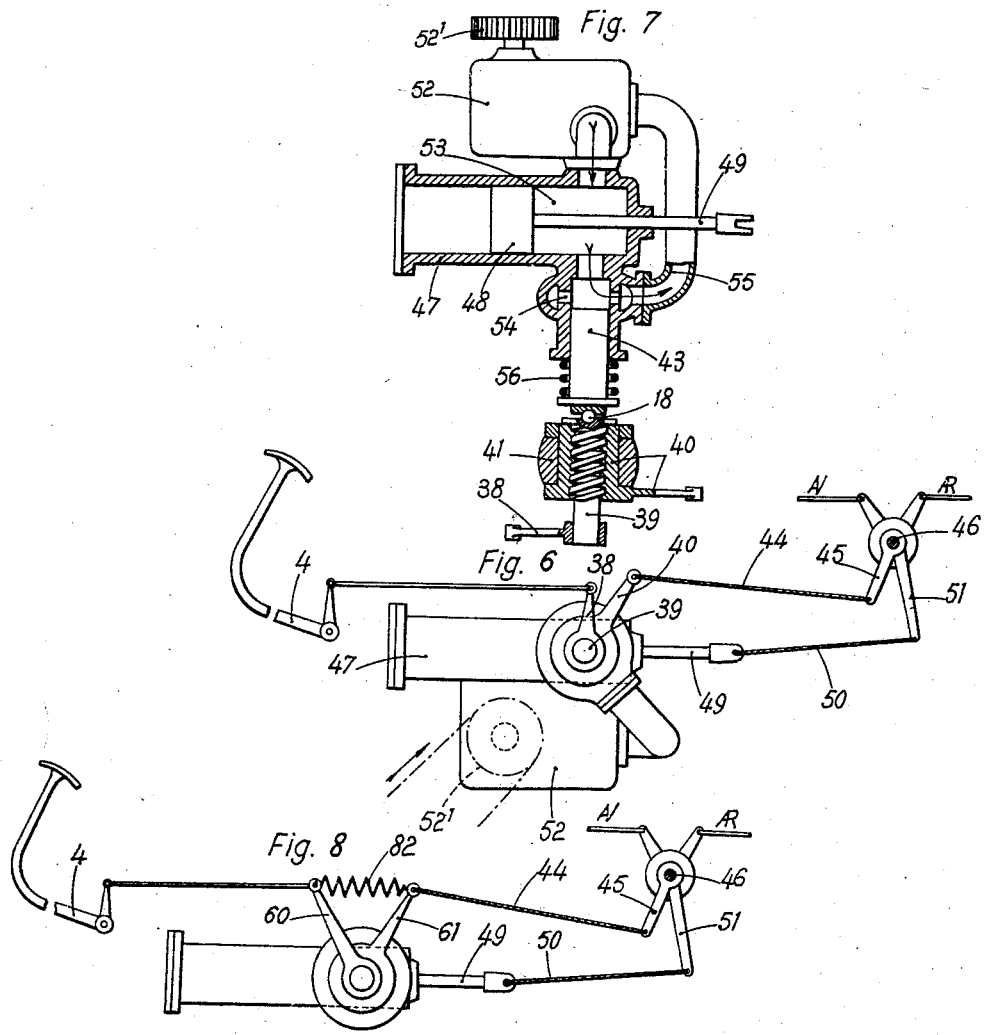

Patented Jan. 7, 1930

1,742,788

UNITED STATES PATENT OFFICE

LÉON SAIVES, OF PARIS, FRANCE, ASSIGNOR TO LOUIS RENAULT, OF BILLANCOURT, FRANCE

BRAKE FOR VEHICLES

Application filed August 28, 1924, Serial No. 734,804, and in France November 30, 1923. Renewed October 18, 1929.

The invention relates to a brake operating mechanism for self-propelled vehicles including means for operating the brakes by the usual foot pedal or equivalent lever mechanism, associated with means involving a servomotor or actuating means deriving its motion from the movement of the vehicle in either direction, adapted to apply a supplemental force to the brakes, which is proportional to the speed of the vehicle and to the initial force supplied by the foot lever.

The invention is illustrated in the accompanying drawings, in which:—

Fig. 1 is a diagrammatic view of the brake operating mechanism.

Fig. 2 is a section on line A—B of Fig. 1.

Fig. 3 is a diagram of a modified form of the apparatus.

Fig. 4 is a plan view of the same, partly in section.

Fig. 5 is a fragmentary sectional elevation of a further modification of the supplementary braking means.

Fig. 6 is a side elevation of a further modification.

Fig. 7 is a sectional plan view of the same.

Fig. 8 is a side elevation of a further modification of the apparatus.

Fig. 9 is a sectional plan view of the same.

Fig. 10 is a detail view of the valve employed in this form of apparatus.

On the shaft 1, receiving its motion by means of a pinion 2, suitably geared to the driving means of the back wheels, is fixed a plate 3 which it should be noted will change its direction of rotation each time that the vehicle changes its direction of running.

The foot-lever 4 controls through a lever 5 integral with its axle and a rod 6, a lever 7 provided with a threaded boss 8 which screws into the tapped boss of a lever 9; this latter can rotate axially without displacement in a fixed support 10.

The lever 9 is connected by means of a cable 11 to a lever 12 integral with an axle 13 which operates by any suitable means the front and back brakes (not shown) of the vehicle. In the drawing, the controls in question are represented diagrammatically by the rods AV and AR.

A plate 14, which together with the plate 3 constitutes a clutch, is carried loose on the same axle as the latter and carries pins 15 and 15' connected by the cables 16 and 16' with a lever 17 keyed on the same axle 13 as the lever 12 and connected to the brake-rods.

If the vehicle is assumed to be stationary, the shaft 1 does not rotate. If, in order to hold the vehicle, the driver presses upon the foot lever 4, by operating the lever 7, this lever screws into the boss of the lever 9 and through the thrust bearing 18 presses on the plate 14 which comes into contact with the plate 3. As this latter is not rotating, the plate 14 is not driven and merely rests against 3. Lever 9, altho in screw-threaded engagement with lever 7, is connected to cable 11, and therefore will not rotate until lever 7 moves axially to the point where plate 14 contacts with plate 3. Axial movement of lever 7 being thus stopped, the engaging threads of both lever 7 and 9 are locked, and further rotation of lever 7 causes rotation of lever 9, thus causing direct pull on the brake rods by means of cable 11.

When on the other hand, the vehicle is in motion the operation is as follows:—The plate 3 is driven round in the direction of the arrow F for example.—When the driver presses on the foot lever, he acts as above explained on the brake rods; but the plate 14 is now driven by 3 in the same direction and through the cable 16 it operates the lever 17 keyed on the axle 13 actuating the brake rods. At this instant the cable 16' becomes slack.

The driving of the plate 14 and consequently the supplementary stress contributed by the servomotor to the brake gear will be proportional to the stress exercised on the foot lever 4.

If the vehicle moves in the opposite direction, the plate 14 is driven in the opposite direction to the arrow F and then it is the cable 16', actuated by the pin 15', which operates the lever 17 and the cable 16 becomes slack.

It is apparent therefore that this arrangement effects the operation of the brakes of the vehicle directly when the vehicle is stationary and when the vehicle is in motion either forwards or backwards imposes a supplementary stress supplied by the servomotor which is added to the action exercised by the driver on the brake rods.

Figures 3 and 4 show a first modification, in which the servomotor is applied by the action of a clutch; one of the members of this clutch approaching the other under the stress applied by the pedal, and, when the vehicle is stationary, one of the two becomes merely a stop, of course without any servomotor action being set up, while, when the vehicle is in motion, there is a regular clutch action and the addition of a supplementary stress. The modified arrangement of clutch drive differs in that it comprises a differential gear.

The foot lever 4 is integral with a gear box 65 which can rotate about pivots 66—66' in bearings of a fixed bracket 67. Inside this gear box there are located two pinions 68—68', having the same axis A—B as the pivots of the gear box 65. These pinions 68—68' gear with one or more pinions 69 capable of rotation about axles 70 integral with a boss 71 having A—B for axis, about which it can rotate freely; these axles are prolonged at 72 into pivots journalled in the differential gear box.

On the axle of the pinion 68 is keyed a lever 73 which through a cable 11 actuates a lever 12 integral with a shaft 13 actuating by means of any suitable intermediate member the front and rear brakes of a vehicle.

On the axle of the pinion 68' is keyed a lever 74 which, by means of a cable 75 and a lever 76 having on its axle 77 a fork 78 taking into the grooved hub 79 of a plate 20, effects the clutching of the said plate, integral with the axle 21, with a plate 23 loose on the shaft 21. The shaft 21 carries a pinion 22 which is driven from the wheels of the vehicle to be braked. The direction of rotation of the shaft 21, thus connected with the wheels, will change at the same time as that of the latter. The plate 23 carries two pins 24 and 25 connected by cables 26 and 27 to a lever 28 keyed on the same axle 13 as the lever 12.

When the vehicle is stationary if the brakes are off and the plate 23 unclutched, and if the driver presses on the foot lever 4, the two levers 73 and 74 are actuated as well as the cables 11 and 75. The cable 11 takes up the play of the brake-rods and advances the brakes against their drums; at this moment, as the resistance increases, the lever 73 and the pinion 68 become motionless.

The pinion 68 being temporarily held, the pinion 68' alone rotates actuating the lever 74 and the cable 75 which operates the clutching of the plate 23 until such clutching has been effected. When the vehicle is stationary, since the shaft 21 does not rotate, no action is produced on the cables 26 and 27; but as soon as the plate 20 comes into contact with the plate 23, the lever 74 becomes motionless in its turn and if the driver continues to press on the foot-lever 4, the pinion 68 begins to rotate actuating the lever 73 and the cable 11 which directly secures the application of the brakes.

If the vehicle is in motion, so that the shaft 21 is rotating, for example in the direction of the arrow F, the course of events will be as described above; but when the pinion 68 becomes motionless, and the cable 11 has moved the brakes towards their drums, the clutched plate 23 will be driven in the direction F and through the cable 25 and the lever 28 will cause the momentum of the vehicle to participate in jamming on the brakes. At this instant, the cable 27 is slack. If on the other hand, the direction of motion of the vehicle actuates the shaft 21 in a direction opposite to the arrow F, the pivot 25 will actuate the cable 27, the cable 26 becoming slack.

There is thus in this arrangement, as in the form shown in Figures 1 and 2, a direct actuation of the brakes by the foot lever under the stress exercised by the driver in conjunction with an actuation by a servomotor furnishing a supplementary stress for braking when the vehicle is moving either forwards or backwards.

Figure 5 shows another modification for operating the brakes by the servomotor.

The plate 23 (corresponding to 14 in the Figures 1 and 2) is integral with a pulley 29, constituting a winch, which actuates through any suitable means 30 (chain, cable, belt), a rod 31 connected to a cable 32 operating the lever 28 (Figure 3) actuating the brakes.

This chain 30 can wind up on the pulley 29 in either direction according to the direction in which the vehicle is moving and will always secure a drag on the cable 32 whether the vehicle is moving forwards or backwards.

The pulley and chain are preferably enclosed in a casing 33, which serves as bearing for the rod 31. A spring 35 is located between a shoulder 34 and a collar 36 on the rod for the purpose of bringing back the chain into the position shown in the drawing when the servomotor is not acting.

Figures 6 and 7 show a construction involving a fluid actuated servomotor. The foot lever 4 actuates by any suitable means a lever 38 keyed on a shaft 39 and screwing into the boss of a lever 40 capable of rotation in a fixed bracket 41.

The lever 38 by the screwing of its axle 39 into boss of lever 40 acts on a valve 43 through a thrust bearing shown diagrammatically by a ball 18.

A pump 52, running in both directions is driven by a pinion 52' which receives motion from a shaft integral with the wheels of the vehicle.

This pump discharges in the direction of the arrows into the chamber 53 of a cylinder 47, in which there is located a piston 48 connected by a rod 49 to a cable 50 actuating a lever 51 keyed on a shaft 46 which actuates the brakes of the vehicle.

The lever 40 is connected by a cable 44 to a lever 45 keyed on the same axle 46 as the lever 51.

When the driver presses on the foot lever 4 actuating the lever 38, the axle 39 screws into the boss of the lever 40 and moves the valve 43 forward against the tension of spring 56 to close the ports 54.

If the vehicle is stationary, the pump does not work, and the driver compresses the spring 56 completely; at this instant, the longitudinal displacement of the axle 39 is checked. Not being able to undergo any further relative displacement, if the driver continues to press on the foot-lever, the lever 38 actuates the lever 40 which directly operates the brakes of the vehicle.

If the vehicle is in motion (forwards or backwards), the pump works and a circuit is set up in the direction of the arrows; the liquid discharged at 53 behind the piston escapes by the orifices 54 and returns to the pump by the pipe 55.

When the driver presses on the foot-lever 4, the lever 38 screws the axle 39 into 40, pushing forward the valve 43 which then closes the orifices 54. The liquid no longer having any or hardly any passage for escape through 55, the pressure in the cylinder 53 increases and shifts the piston 48 which through the rod 49, the cable 50 and the lever 51 actuates the brakes of the vehicle.

The spring 56 is calibrated in such manner as to prevent the driver from pushing the piston 43 to the bottom too suddenly; the driver will have to overcome the resistance of this spring, and thus he will be able to close the orifices 54 more or less according to the degree of braking required.

Figures 8, 9 and 10 relate to a modification of the control for closing the circuit of the compressed fluid in which the levers screwing into each other have been omitted.

In this case the levers 60 and 61 are mounted on concentric axles 62—63. These axles are integral with plates 64—64', constituting distributing valves and provided with orifices 80—81, Figure 10. These levers are connected by a spring 82, which tends to draw them together.

When the vehicle is stationary and the foot lever is operated, the lever 60 is actuated, stretching the spring 82 to a predetermined extent; at this instant, it actuates the lever 61 and through the cable 44 the brake gear of the vehicle. A stop may be arranged to ensure the actuation of the lever 61 by the lever 60.

If the vehicle is in motion, the circuit is opened as in the preceding case by the orifices 80—81 and the liquid discharged into 53, returns to the pump by the pipe 55.

When the foot lever is depressed, the levers have the positions a, b of Figure 10, but tend to take up the positions a'—b' whilst the spring 82 is stretching, and during this stretching close progressively the passage of the liquid through the orifices 80—81; the pressure in the cylinder 53 then increases, and the brakes are operated by the piston rod 49, the cable 50 and the lever 51.

What I claim is:

1. Brake operating mechanism for self-propelled vehicles, comprising pedal actuated means for applying the brakes including two levers having interengaged threaded hubs, and additional means comprising a servo motor for applying said brakes when the vehicle is in motion, said servomotor comprising a clutch member actuated by one of said hubs and a vehicle-driven clutch member adapted to be engaged by said first clutch member upon operation thereof by one of said hubs, and means for connecting said first clutch member to the actuating means for said brakes, whereby the servomotor will actuate said brakes in addition to the actuation thereof by said pedal actuated means.

2. Brake operating mechanism for self-propelled vehicles, comprising pedal actuated means for applying the brakes including two levers having interengaged hubs, and additional means comprising a servo motor for applying said brakes when the vehicle is in motion, said servo motor comprising a clutch member adapted to be engaged by said first clutch member upon operation thereof by one of said hubs, and means for connecting said first clutch member to the actuating means for said brakes, whereby the servo motor will actuate said brakes in addition to the actuation thereof by said pedal actuated means.

In testimony whereof I have signed my name to this specification.

LÉON SAIVES.